United States Patent [19]

Schwimmer

[11] 4,132,529

[45] Jan. 2, 1979

[54] TEMPERATURE CONTROL IN EXOTHERMIC/ENDOTHERMIC REACTION SYSTEMS

[75] Inventor: Michael F. Schwimmer, Tucson, Ariz.

[73] Assignee: UOP Inc., Des Plaines, Ill.

[21] Appl. No.: 841,876

[22] Filed: Oct. 13, 1977

Related U.S. Application Data

[63] Continuation-in-part of Ser. No. 794,152, May 5, 1977.

[51] Int. Cl.² .................. B01J 8/02; C10G 35/04; G05D 11/02; G06F 15/46
[52] U.S. Cl. ........................... 23/230 A; 137/2; 137/110; 208/146; 208/DIG. 1; 364/500; 422/109
[58] Field of Search ... 23/230 A, 253 A, 288 R (U.S. only), 23/288 H, 288 K; 208/146, DIG. 1; 137/3, 90, 2, 110; 364/500

[56] References Cited

U.S. PATENT DOCUMENTS

| | | | |
|---|---|---|---|
| 2,285,716 | 6/1942 | Hulsberg | 23/288 R |
| 2,330,767 | 9/1943 | Welty, Jr. | 23/288 R X |
| 2,606,862 | 8/1952 | Keith | 208/146 |
| 3,031,267 | 4/1962 | Martin et al. | 23/253 A X |
| 3,506,715 | 4/1970 | Clark | 23/230 A |
| 3,751,229 | 8/1973 | Bajek et al. | 23/253 A |
| 3,979,183 | 9/1976 | Scott | 23/253 A |

Primary Examiner—Joseph Scovronek
Attorney, Agent, or Firm—James R. Hoatson, Jr.; William H. Page, II; Robert W. Erickson

[57] ABSTRACT

Control of temperature increase (delta-T) through a reaction zone, in which both exothermic and endothermic reactions are effected, is achieved by sensing the inlet temperature of the charge stock, an intermediate temperature within the reaction zone and the outlet temperature of the effluent from the reaction zone. The inlet temperature sensor co-acts with a temperature recorder controller (TRC) having an adjustable set point, to produce a representative signal which is transmitted to flow-regulating means which adjusts the quantity of charge stock bypassing the feed heater. The difference between the inlet and intermediate temperatures, and that between the intermediate and outlet temperatures are determined to produce two delta-T signals which are transmitted to a double differential temperature recorder controller (DdTRC) which develops a signal representing the difference between the two delta-T signals, compared to a preset difference. The signal is transmitted to the inlet temperature recorder controller to adjust the set point thereof, and the quantity of charge stock bypassing the feed heater is further regulated responsive thereto. Enhanced control is afforded by selecting the higher of the intermediate and outlet temperatures, developing another representative signal and adjusting the signal being transmitted to the charge stock bypass regulating means.

7 Claims, 1 Drawing Figure

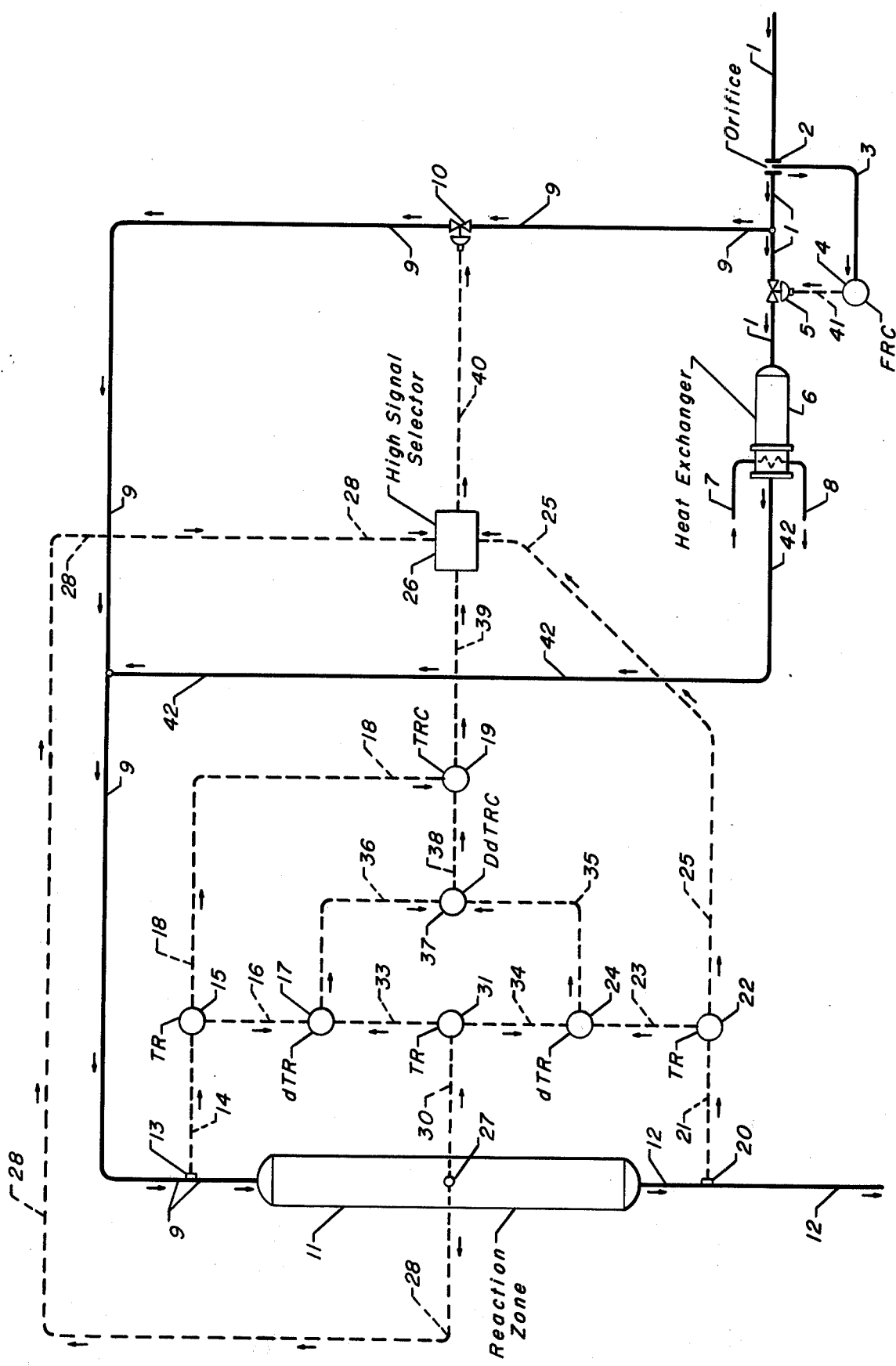

TEMPERATURE CONTROL IN EXOTHERMIC/ENDOTHERMIC REACTION SYSTEMS

RELATED APPLICATION

The present application is a Continuation-In-Part of my copending application, Ser. No. 794,152, filed May 5, 1977, all the teachings of which copending application are incorporated herein by way of specific reference thereto.

APPLICABILITY OF INVENTION

My inventive concept, as herein more fully described, encompasses a technique for preventing and alleviating so-called temperature run-away prevalent in catalytic hydrocarbon conversion processes in which the reactions effected are both exothermic and endothermic. Therefore, the present invention essentially involves a method for controlling the temperature rise through a catalytic reaction zone in which exothermic reactions predominate.

Whereas hydrogen-producing reactions — e.g. dehydrogenation of naphthenes to aromatic hydrocarbons — are endothermic in nature, hydrogen-consuming reactions are primarily exothermic. The latter are prevalent in a multitude of hydrocarbon conversion processes widely utilized throughout the petroleum industry, and are often integrated in combination with an endothermic reaction process — e.g. a combination of hydrotreating followed by catalytic reforming. Principally exothermic processes include hydrodesulfurization, hydrodenitrification, dealkylation, hydrotreating (olefin saturation), hydrocracking, etc., all of which have been previously categorized as hydroprocesses. In many such processes, the reactions being effected are both exothermic and endothermic, with the former generally predominating. Specifically, the present control technique is particularly directed toward control of the temperature increase experienced through an exothermic, catalytic reaction zone in which endothermic reactions are also taking place. As is well known in the appropriate art, unabated exothermic reactions can readily evolve into the natural consequence of a temperature run-away to the extent that catalyst damage (often irreparable), hardware damage and undesired side reactions take place. The principal function of the present control system is to insure against deleterious temperature run-aways in hydrocarbons processes in which the reactions effected are primarily exothermic, while simultaneously considering the effect of endothermic reactions.

OBJECTS AND EMBODIMENTS

An object of my invention is to provide a method for controlling the temperature rise through a reaction zone in which the reactions effected are both exothermic and endothermic. A corollary objective is directed toward a control system for preventing temperature run-away in a hydrocarbon conversion process in which hydrogen is consumed.

More specifically, my inventive concept directs itself to a cascade temperature control system, the objective of which resides in controlling the hydrogen-consuming processing of hydrocarbons.

In one embodiment, therefore, the present invention is directed toward a hydrocarbon conversion system wherein (1) a hydrocarbonaceous charge stock is introduced into heating means in which the temperature thereof is increased prior to passing into a reaction zone and, (2) the reactions effected in said reaction zone are both exothermic and endothermic in nature, and provides the method of controlling the temperature rise through said reaction zone which comprises the steps of: (a) sensing (i) the temperature of said charge stock at the inlet to said reaction zone and developing a first signal representative thereof, (ii) the temperature at an intermediate locus within said reaction zone and developing a second signal representative thereof, and, (iii) the temperature of the effluent from said reaction zone and developing a third signal representative thereof; (b) comparing said inlet charge stock temperature with that temperature specified by the adjustable set point of a temperature controller, developing a fourth signal representative of said comparison and regulating the quantity of said charge stock which is caused to bypass said heating means in response to said fourth signal; (c) measuring the difference between said first and second signals and developing a fifth signal representative of said difference; (d) measuring the difference between said second and third signals and developing a sixth signal representative of said difference; (e) comparing said fifth and sixth signals, developing a seventh signal representative of said comparison and readjusting the set point of said temperature controller in response to said seventh signal; and, (f) further regulating the quantity of said charge stock which is caused to bypass said heating means in response to the readjustment of said set point.

This embodiment is further characterized in that a selection is made of the higher of said second and third signals, and said fourth signal is adjusted, or overridden in response to said selected signal.

In another embodiment, my invention is intended for utilization in a hydrocarbon conversion process wherein (1) a hydrocarbon charge stock is passed into heating means in which its temperature is increased prior to the introduction thereof into a reaction zone and (2) the reactions effected in said zone are both exothermic and endothermic in nature, and affords a control system for controlling the temperature rise through said reaction zone which comprises, in cooperative relationship: (a) first temperature-sensing means, co-acting with first temperature-indicating means, sensing the temperature of said charge stock at the inlet to said reaction zone and developing a first signal representative thereof; (b) second temperature-sensing means, co-acting with second temperature-indicating means, sensing the temperature at an intermediate locus within said reaction zone and developing a second signal representative thereof; (c) third temperature-sensing means, co-acting with third temperature-indicating means, sensing the temperature of the effluent from said reaction zone and developing a third signal representative thereof; (d) means for regulating the quantity of said charge stock caused to bypass said heating means; (e) first signal transmitting means for transmitting said first signal to set point-adjustable temperature control means developing a fourth signal representative of a comparison between said first signal and said set point; (f) second signal-transmitting means for transmitting said fourth signal to said regulating means whereby the quantity of said charge stock bypassing said heating means is adjusted in response thereto; (g) first differential temperature means measuring the difference between said first and second signals and developing a fifth signal representing said difference; (h) second differential temperature means measuring the difference between said second and third signals and developing a sixth signal representing said difference; (i) means for comparing said fifth and sixth signals, and developing a seventh signal representing the comparison; and, (j) third signal-transmitting means for transmitting said seventh signal to said set point-adjustable temperature control means, to adjust said set point in response thereto.

This specific embodiment may also be further characterized in that the control system additionally comprises fourth and fifth signal-transmitting means respectively transmitting said second and third signals to signal selecting means adjusting, or overriding said fourth signal responsive to the higher of said second and third signals.

Other contemplated objects and embodiments, although not specifically delineated herein, will become evident from the following, more detailed description of my invention and the exothermic reaction control method which it encompasses. In one such additional embodiment, flow-control means is used to maintain the total quantity of the feed stream to the reaction zone substantially constant.

CITATION OF PRIOR ART

Control systems, as well as their methods of use, must be generally acknowledged as old in the art of hydrocarbon processing. Similarly, candor compels recognition of the fact that the published literature is replete with a myriad of techniques designed to afford some measure of control over some aspect of reaction zone temperature; this, whether the reactions are principally endothermic, exothermic, or both. In view of the voluminous nature thereof, no attempt will be made herein to delineate exhaustively the appropriate prior art.

Much of the early work in the control system art was directed toward fractionation column temperature control for the avowed purpose of controlling the composition of the product at either end thereof. For instance, in U.S. Pat. No. 2,580,651 (Cl. 203-2), issued Jan. 1, 1952, a double-differential temperature sensing system, above and below the feed tray, is utilized to control the heat-input to the column via the reboiled liquid bottoms stream. The flow rate of the heat-exchange medium is regulated in response to the signal developed by the double-differential temperature controller, thereby adjusting the heat-input to the reboiler section of the column.

Control of reaction zone severity (moderating the inlet and outlet temperatures, and regulating the catalyst bed inlet temperature), in response to the actane rating of the normally liquid effluent from a catalytic reforming process, is the subject of U.S. Pat. No. 3,751,229 (Cl. 23-253A), issued Aug. 7, 1973. Three variations are illustrated in the three Figures; in FIG. 1, the inlet temperature is sensed and compared to that called for by a set point-adjustable temperature controller, and a representative signal is transmitted to regulating means to adjust the quantity of fuel to a direct-fired heater into which the charge stock is passed. A signal representing the octane rating of the liquid phase effluent is generated and transmitted to the temperature controller to adjust the set point thereof. In FIG. 2, a set point-adjustable differential temperature controller monitors the inlet and outlet temperatures of the reaction and compares the delta-T with that called for by the set point which is adjusted in response to the signal generated by the octane monitor. A signal representative of the comparison between the delta-T and the set point is transmitted to the inlet temperature controller to re-adjust its set point, and the flow of fuel to the direct-fired heater is regulated accordingly. In FIG. 3, the inlet temperature controller is eliminated and the fuel-regulating signal is transmitted directly from the set point-adjustable differential temperature controller.

A method for effecting heat balance in a fractionation column, and a control system therefor, is illustrated in U.S. Pat. No. 4,024,027 (Cl. 203-2), issued May 17, 1977. The fractionation column functions under total reflux with the desired overhead product stream (in this instance benzene is separated from a mixture thereof with toluene and xylene) being withdrawn from a locus below the reflux introduction and below the uppermost fractionation tray. Signals representing three delta-T's are utilized in regulating the quantity of reflux returned to the top of the column and the enthalpy (heat-input content) of the reboiler liquid stream. With respect to the latter, two temperatures are sensed below the feed tray and proximate thereto. A differential temperature recorder controller measures the difference and transmits an appropriate signal to a set point-adjustable flow controller which regulates the flow of the heat-exchange medium employed to raise the temperature of and partially vaporize the reboiled bottoms stream. Reflux return is regulated utilizing four temperature sensors spaced along virtually the entire height of the column, one pair being above the feed tray and the second below. The temperature differential for each pair is determined; representative signals are transmitted to a double differential summing relay which transmits an appropriate signal to a double differential temperature recorder controller. The latter transmits an appropriate signal to regulating means which adjusts the flow of benzene withdrawn from the column. This signal is also used in conjunction with an internal reflux modulator to regulate reflux return.

SUMMARY OF INVENTION

In essence, the present invention insures against temperature run-aways by controlling the temperature rise experienced through the reaction zone of a catalytic process wherein the reactions effected are both exothermic and endothermic. Although the method of control, and system therefor, may be applied to non-catalytic reactions, utilization in those processes which are catalytically effected will be more advantageous. Furthermore, the number of reaction zones employed in any selected process is inconsequential, as is the fact that two or more zones may be utilized either in series, or in parallel. With some modifications, additional benefits accrue where the control system and method functions with two or more parallel-flow catalytic reaction zones.

As hereinbefore stated, the control system is intended to control the exothermic temperature rise through the reaction zone. The endothermic reactions taking place simultaneously, as is quite common when utilizing dual-function catalytic composites, form the basis for the method and system founded upon the present inventive concept. Likewise, there is no intent to limit the present invention to the physical and/or chemical characteristics of the catalytic composite employed within the reaction zone. The sole criterion is whether, at any given point in time, the exothermic reactions predominate to the extent that an unusual temperature rise through the reaction zone is experienced, and the possibility of a temperature run-away becomes imminent.

In hydrocarbon processing, regardless of the particular reactions involved, the fresh feed stream, or charge stock, is heated to an elevated temperature prior to the introduction thereof into the reaction zone. The particular level to which the temperature is increased, is determined by the temperature desired at the inlet to the catalyst bed within the reaction zone. During the design of a hydrogen-consuming, exothermic process, previous experience will dictate an advisable maximum allowable temperature differential (increase) across the catalyst bed for the intended fresh feed capacity, or charge rate. This delta-T is generally dictated by the maximum allowable catalyst bed, or product effluent outlet temperature which, when exceeded, will result in detrimental reactions and/or initiate a temperature run-away such that catalyst damage (primarily deactivating carbon deposition or change in physical characteristics) constitutes a serious risk.

The method of controlling the temperature rise through the reaction zone, or the overall exothermicity of the reactions, is effected through the use of a cascade control system which regulates the quantity of fresh feed charge stock which is not increased in temperature prior to the introduction thereof into the reaction zone. That is, the quantity of comparatively "cold" feed which is caused to bypass the heating means is adjusted responsive to output signals generated by the control system. Briefly, the fresh charge stock, on flow control, is introduced into the process at a substantially constant rate which is specified by the design liquid hourly space velocity (volumes of charge stock per hour per volume of catalyst within the reaction zone). A portion of the feed passes through suitable heating means which may be a direct-fired heater, and/or an indirect heat-exchange system, the latter utilizing one or more hotter streams from within the overall process. The remaining portion of the fresh feed stream bypasses the heating means and is subsequently admixed with the heated portion.

The temperature of the total feed reactant stream as it enters the reaction zone, or initially contacts the catalytic composite disposed therein, is determined by suitable temperature-sensing means co-acting with a Temperature Recorder Controller (TRC) having an adjustable set point. A comparison is made of the inlet, or initial catalyst bed temperature with that temperature specified by the adjustable set point of the TRC; a signal is generated which represents the comparison, and is transmitted to flow-regulating means — e.g. a flow control valve — which is adjusted in response thereto, and the quantity of charge stock caused to bypass the charge heater is regulated accordingly. Where the inlet temperature is higher than that specified by the adjustable set point of the TRC, the generated signal will effect a further opening of the flow-control valve and a greater quantity of the fresh feed will bypass the heating means.

A second temperature is sensed at an intermediate locus within the reaction zone and a representative signal is generated. The outlet temperature of the product effluent stream, or outlet of the catalyst bed, is also sensed and a third signal representative thereof is generated. Differential Temperature Recorders (dTR's) measure the delta-T between the inlet and intermediate temperatures, and the delta-T between the intermediate and outlet temperatures. Representative signals are transmitted to a Double Differential Temperature Recorder Controller (DdTRC) which generates still another signal representing the difference between the two delta-T's; this last signal is transmitted to the TRC and an appropriate adjustment is made to the adjustable set point thereof which causes a corresponding change in the first signal to further regulate the quantity of charge stock caused to bypass the heating means. A Flow Recorder Controller, flow-sensing means (orifice plate or turbine meter) and flow-regulating means (flow control valve) are utilized to maintain the total fresh feed rate to the reaction zone substantially unchanged in order to conform to the design liquid hourly space velocity.

My invention further provides a high temperature override system, utilizing a high temperature signal selector. This further insures that excessive exothermic reactions will not create temperatures which might cause irreparable damage to the catalytic composite disposed within the reaction zone. To function, signals representing the intermediate and outlet catalyst bed temperatures are transmitted to the High Signal Selector (HSS) as is the adjusted signal from the TRC. Normally, the latter would be the controlling, or relatively higher signal. However, where the combination of exothermic and endothermic reactions results in excessive outlet or intermediate bed temperatures, the HSS selects the higher signal for adjusting, or overriding.

DESCRIPTION OF DRAWING

The accompanying diagrammatic illustration is presented for the sole purpose of affording a clear understanding of the control system and method encompassed by the present invention. It is not, therefore, considered to have a limiting effect upon the scope and spirit of my invention as defined by the appended claims. In the illustration, reaction zone 11 constitutes a selective hydrocracking system which is integrated into a combination process with a catalytic reforming unit. Since the latter forms no essential feature of my invention, it is not illustrated herein. Specific details of this "in-line" hydrocracking/catalytic reforming process are found in U.S. Pat. No. 3,847,792 (Cl. 208-60), issued Nov. 12, 1974. Briefly, the fresh feed charge stock is introduced, in admixture with excess hydrogen from the catalytic reforming system, into the hydrocracking zone. Product effluent, without intermediate separation, is increased in temperature (generally via a direct-fired heater) and introduced into the reforming zone.

Hydrocracking reaction zone 11 is unlike the more common hydrocracking processes both in function and result. The charge stock is characterized as being within the naphtha boiling range and the net product effluent contains very little normally gaseous material such as methane and ethane. Through the utilization of a particular catalytic composite, the integrity of cyclic rings is largely maintained, and the cracking of paraffins results in low molecular weight isoparaffins. The selective nature of the hydrocracking reactions taking place includes the retention of cyclic rings and the reduction in the molecular weight thereof, via isomerization and the splitting of paraffins from the parent cyclic molecule. As will be recognized by those having the requisite skill in the petroleum refining art, the reactions are both exothermic and endothermic in nature. Generally, exothermic reactions predominate in the initial portion of the reaction zone, while endothermic reactions are prevalent in the final portion of the catalyst bed. However, this does not necessarily hold true for all combinations of reaction conditions which are selected from those hereinafter specified. To illustrate, the exothermic reactions may not have been completed until a point following that at which the intermediate bed temperature is sensed, in which case the outlet temperature would be higher. Conversely, the completion of the endothermic reactions might take place at the very end of the catalyst bed to give a misleading outlet temperature. The use of the high signal selector makes either situation innocuous.

The conversion conditions in the illustrated hydrocracking system include a liquid hourly space velocity ranging from about 0.5 to about 10.0, preferably having an upper limit of about 4.0, a hydrogen circulation rate of from about 1 to about 20 moles per mole of feed and a comparatively low pressure of about 100 psig. to about 500 psig. (7.8 to 35.0 atm.). Of greater significance, a maximum catalyst bed temperature of about 400° F. (204° C.) to about 800° F. (426° C.) is specified. In most instances, the maximum catalyst bed temperature will be greater than 600° F. (315° C.). Temperature rise through the hydrocracking system (outlet temperature minus inlet temperature) is maintained at about 30° F. (16.7° C.) to about 100° F. (55.6° C.), and more often between about 40° F. (22.4° C.) and 75° F. (41.7° C.).

Specifically referring now to the drawing, reaction zone 11 is shown as a single vessel. Fresh feed charge stock enters the process by way of line 1; this contains a flow-control loop consisting of orifice plate 2 (or a venturi, or turbine meter), flow-control valve 5 and Flow Recorder Controller 4. The latter is equipped with an adjustable set point which permits changes in the liquid hourly space velocity; generally, however, the set point will remain unchanged once a steady-state operation at design capacity has been achieved. The pressure differential across orifice plate 2 is transmitted via line 3 to FRC 4 and compared to the setting of the set point; any variance is transmitted by way of instrument line 41 to control valve 5, the opening of which is accordingly adjusted. A portion of the charge stock is diverted through line 9, containing flow-control valve 10, the remainder continuing through line 1 into heat-exchanger 6. Recycled, and/or make-up hydrogen is preferably added to the charge stock between control valve 5 and heat-exchanger 6. The charge stock in line 1 is at a temperature approximating 212° F. (100° C.) and a pressure of about 455 psig. (32 atm.). The temperature is increased to about 762° F. (405° C.) in heat-exchanger 6, utilizing the catalytically reformed effluent at a temperature of about 980° F. (527° C.), as the heat-exchange medium in line 7; the cooled reformed effluent, at about 570° F. (299° C.) exits via line 8. The heated charge stock passes through conduit 42 and is admixed with the "cold" feed bypass stream in line 9, the mixture continuing therethrough, at a temperature of about 725° F. (385° C.) and a pressure of about 415 psig. (29.2 atm.), into reaction zone 11.

Control of the charge stock inlet temperature is effected by way of sensing means 13, illustrated as being disposed in feed conduit 9. It is understood that it is within the scope of the present invention to install temperature-sensing means 13 within reaction zone 11 proximate to the inlet of the catalyst bed. Temperature-sensing means 13 is shown as co-acting with Temperature Recorder (TR) 15, via instrument line 14, and then with Temperature Recorder Controller (TRC) 19, via instrument line 18. These have been shown as two separate instruments only for convenience in illustrating the multiplicity of dashed signal-transmitting means associated therewith; thus, instrument line 14 could have been illustrated as connecting directly with TRC 19. Similarly, intermediate temperature-sensing means 27 is shown as co-acting with TR 31 and High Signal Selector 26 via instrument lines 30 and 28, respectively.

Temperature Recorder 15 receives the indication of the inlet temperature via line 14 and develops a first signal representative thereof; this is transmitted via instrument line 18 to Temperature Recorder Controller 19. The temperature is compared to that which is specified by the adjustable set point of TRC 19. Similarly, an intermediate catalyst bed temperature is sensed by sensing means 27 which co-acts with TR 31 via instrument line 30. The temperature of the product effluent stream in line 12 is indicated by sensing means 20 which may be disposed within reaction zone 11 proximate to the outlet of the catalyst bed. Temperature-sensing means 20 co-acts with Temperature Recorder 22 via instrument line 21.

Temperature Recorders 15, 31 and 22 develop first, second and third signals representative of the inlet, intermediate and outlet temperatures, respectively. The first and second signals are transmitted to Differential Temperature Recorder (dTR) 17, by way of instrument lines 16 and 33, which develops a signal representing the difference, or the degree of exothermicity experienced in the upper portion of the catalyst bed. Similarly, the second and third signals are transmitted to dTR 24, via instrument lines 34 and 23, which generates a signal representing the temperature difference experienced in the lower portion of the catalyst bed. A Double Differential Temperature Recorder Controller (DdTRC) 37 receives the signal from dTR 17 via line 36 and the signal from dTR 24 via line 35, and generates a signal representing the comparison of the difference between the two delta-T's measured in the upper and lower portions of the catalyst bed, and its adjustable set point.

The signal generated by DdTRC 37 is transmitted to TRC 19 by way of instrument line 38. As above stated, the signal representing the catalyst bed inlet temperature is transmitted to TRC 19 via line 18. The controller compares the indicated temperature with that which is specified by its adjustable set point; the signal representing the comparison is transmitted via instrument line 39, high signal selector (HSS) 26 and instrument line 40 to flow control valve 10, the opening of which is accordingly changed and the quantity of cold feed bypass in line 9 appropriately adjusted. To account for the variations of temperature throughout the catalyst bed, as a result of both exothermic and endothermic reactions being effected, DdTRC 37 compares the difference between the two measured delta-T's with its set point and transmits the appropriate signal, via line 38, to TRC 19. The set point of the latter is adjusted which effects a change in the signal representing a comparison of the inlet temperature with that now called for by the set point. The degree of change in the signal effects further adjustment in the opening of control valve 10 to regulate the quantity of cold feed bypass.

Preferably, as hereinabove set forth, the control system incorporates a high temperature override technique through the use of a high-temperature signal selector 26. This receives the adjusted inlet temperature signal from TRC 19 (via line 39), the intermediate catalyst bed temperature signal via line 28 and the catalyst bed outlet signal from TR 22 (via line 25). The high signal is selected and used to adjust, or override the signal transmitted by TRC 19.

The foregoing specification, particularly when viewed in conjunction with the accompanying drawing and the description thereof, clearly sets forth the method of utilizing the present cascade exothermic reaction control system.

I claim as my invention:

1. In a hydrocarbon conversion method wherein (1) a hydrocarbonaceous charge stock is introduced into heating means in which the temperature thereof is increased prior to passing into a reaction zone and, (2) the reactions effected in said reaction are both exothermic and endothermic in nature, the method of controlling the temperature rise through said reaction zone which comprises the steps of:
   (a) sensing (i) the temperature of said charge stock at the inlet to said reaction zone and developing a first signal representative thereof, (ii) the temperature at an intermediate locus within said reaction zone and developing a second signal representative thereof, and, (iii) the temperature of the effluent from said reaction zone and developing a third signal representative thereof;
   (b) comparing said inlet charge stock temperature with that temperature specified by the adjustable set point of a temperature controller, developing a fourth signal representative of said comparison and regulating the quantity of said charge stock which is caused to bypass said heating means in response to said fourth signal;
   (c) measuring the difference between said first and second signals and developing a fifth signal representative of said difference;
   (d) measuring the difference between said second and third signals and developing a sixth signal representative of said difference;
   (e) comparing said fifth and sixth signals, developing a seventh signal representative of said comparison and readjusting the set point of said temperature controller in response to said seventh signal; and,
   (f) further regulating the quantity of said charge stock which is caused to bypass said heating means in response to the readjustment of said set point.

2. The method of claim 1 further characterized in that a selection is made of the higher of said second and third signals and said fourth signal is adjusted in response to said selected higher signal to regulate the quantity of charge stock caused to bypass said heating means.

3. The method of claim 1 further characterized in that said seventh signal represents the difference between said fifth and sixth signals.

4. The method of claim 1 further characterized in that said fourth signal is transmitted to flow control means, from the resulting adjustment of which the quantity of said charge stock caused to bypass said heating means is regulated.

5. The method of claim 1 further characterized in that the total amount of said charge stock introduced into said reaction zone remains substantially unchanged.

6. In a hydrocarbon conversion apparatus wherein (1) a hydrocarbon charge stock is passed into heating means in which its temperature is increased prior to the introduction thereof into a reaction zone and (2) the reactions effected in said zone are both exothermic and endothermic in nature, a control system for controlling the temperature rise through said reaction zone which comprises, in cooperative relationship:
   (a) first temperature-sensing means, co-acting with first temperature-indicating means, sensing the temperature of said charge stock at the inlet to said reaction zone and developing a first signal representative thereof;
   (b) second temperature-sensing means, co-acting with second temperature-indicating means, sensing the temperature at an intermediate locus within said reaction zone and developing a second signal representative thereof;
   (c) third temperature-sensing means, co-acting with third temperature-indicating means, sensing the temperature of the effluent from said reaction zone and developing a third signal representative thereof;
   (d) means for regulating the quantity of said charge stock caused to bypass said heating means;
   (e) first signal transmitting means for transmitting said first signal to set point-adjustable temperature control means developing a fourth signal representative of a comparison between said first signal and said set point;
   (f) second signal-transmitting means for transmitting said fourth signal to said regulating means whereby the quantity of said charge stock bypassing said heating means is adjusted in response thereto;
   (g) first differential temperature means measuring the difference between said first and second signals and developing a fifth signal representing said difference;
   (h) second differential temperature means measuring the difference between said second and third signals and developing a sixth signal representing said difference;
   (i) means for comparing said fifth and sixth signals, and developing a seventh signal representing the comparison; and,
   (j) third signal-transmitting for transmitting said seventh signal to said set point-adjustable temperature control means, to adjust said set point in response thereto.

7. The apparatus of claim 6 additionally comprising fourth and fifth signal-transmitting means respectively transmitting said second and third signals to signal selecting means and adjusting said fourth signal responsive to the higher of said second and third signals.

* * * * *